United States Patent [19]

Hatsuno

[11] 4,399,681
[45] Aug. 23, 1983

[54] FORGING OF AN ARTICLE HAVING A PLURALITY OF LONGITUDINALLY ARRANGED PROTUBERANCES

[75] Inventor: Hiroshi Hatsuno, Higashi-Matsuyama, Japan

[73] Assignee: Diesel Kiki Co., Ltd., Tokyo, Japan

[21] Appl. No.: 231,132

[22] Filed: Feb. 3, 1981

[30] Foreign Application Priority Data

Feb. 27, 1980 [JP] Japan .................................. 55-23759

[51] Int. Cl.³ .............................................. B21K 1/12
[52] U.S. Cl. ........................................ 72/342; 72/357
[58] Field of Search ................. 72/342, 364, 377, 357; 219/150, 151, 152, 156; 29/6, DIG. 24; 74/567; 123/90.6

[56] References Cited

U.S. PATENT DOCUMENTS 2,598,868  6/1952  White .................................. 219/152
2,669,637  2/1954  Pitt et al. .................................. 29/6
3,413,432  11/1968  Hormann ............................... 72/342
4,317,355  3/1982  Hatsuno et al. .

FOREIGN PATENT DOCUMENTS 2051634A  1/1981  United Kingdom .

Primary Examiner—Lowell A. Larson
Attorney, Agent, or Firm—Frishauf, Holtz, Goodman & Woodward

[57] ABSTRACT

A method of forging an article such as a camshaft, which is formed integrally with a plurality of protuberances longitudinally arranged thereof wherein a blank for the article has its protuberance-forming portions heated to temperatures higher than its other portions. The heating temperatures of the individual protuberance-forming portions are proportionate, respectively, to the radial sizes of corresponding portions of the blank to be protruded from the peripheral surface of the blank for formation of the protuberances during the compressing step.

5 Claims, 8 Drawing Figures

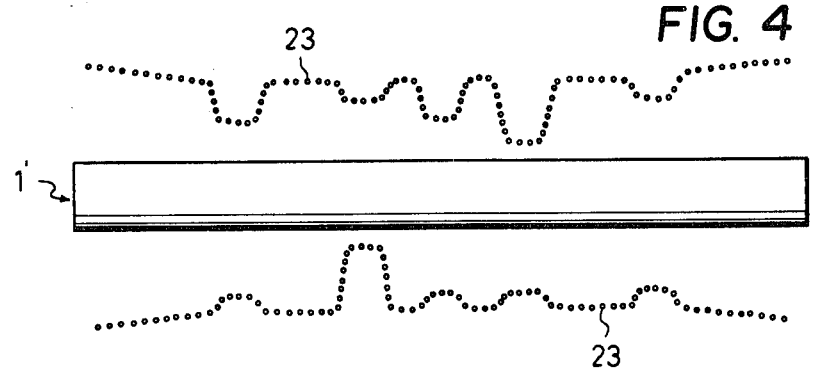
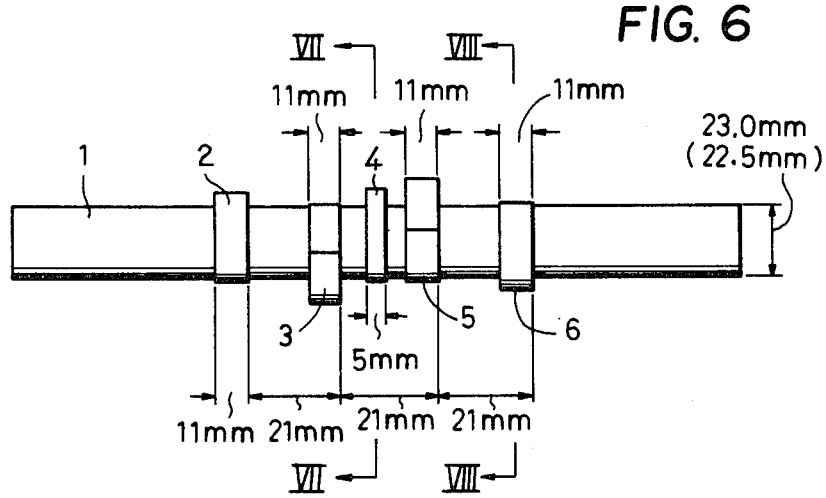
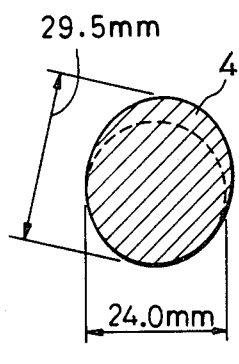
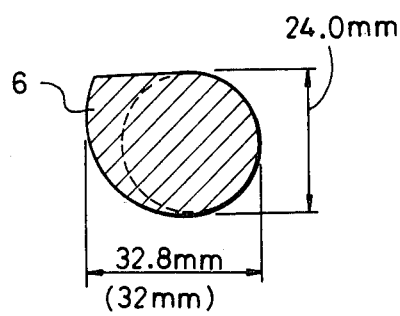

FORGING OF AN ARTICLE HAVING A PLURALITY OF LONGITUDINALLY ARRANGED PROTUBERANCES

BACKGROUND OF THE INVENTION

This invention relates to the manufacture of metallic products having definite forms and made of steel or other metals, and more particularly to the forging of steel bars or steel wires into articles formed integrally with longitudinally arranged protuberances, such as camshafts.

In recent years, in place of the hot forging method, a cold forging method has become employed in working metal blanks into mechanical parts of various configuration, which can provide a final product in a simpler and more prompt manner merely be compressing a blank for the product placed in a die to be plastically deformed, with no substantial need for the deformed material to be cut.

According to the conventional cold forging method, a camshaft blank is first heated and the resulting heated blank is axially compressed at the opposite ends in a forging die having a predetermined mold configuration to form plane cams along the peripheral surface of the blank in a longitudinal arrangement.

However, the conventional cold forging method has the disadvantage that there occur discontinuities in the forged fibre flow at the roots of the plane cams thus formed, causing cracks in those roots, at worst. As a consequence, the resulting camshaft has very low mechanical strength and is not suitable for actual use.

OBJECT AND SUMMARY OF THE INVENTION

It is therefore the object of the invention to provide a forging method for manufacturing articles each having a plurality of protuberances longitudinally formed thereof, which has a breakless forged fibre flow with no crack formed in the roots of the protuberances and accordingly has high mechanical strength.

According to the invention, there is provided a method of manufacturing by forging an article having a plurality of protuberances integrally formed thereon in a longitudinal arrangement, such as a camshaft, the method comprising:

(a) heating an elongated blank of a metal or an alloy thereof in a manner such that the blank has a plurality of protuberance-forming portions thereof heated to respective predetermined temperatures higher than the other portions thereof, (b) positioning said blank thus heated into a forging die; and (c) applying pressure to said blank at opposite ends thereof in a heated state in said forging die to cause same to be axially compressed, whereby protuberances are formed on the protuberance-forming portions of said blank;

(d) wherein said respective predetermined heating temperatures for said protuberance-forming portions of said blank are proportionate, respectively, to the radial sizes of corresponding portions of said blank which are protruded from the peripheral surface of said blank for formation of said protuberances in said step (c).

The above and other objects, features and advantages of the invention will be more apparent upon reading of the ensuing detailed description taken in connection with the accompanying drawings.

BRIEF DESCRIPTION OF THE DRAWINGS

FIG. 4 is a schematic view showing an example of the arrangement of a heating coil forming part of a heating apparatus for heating a camshaft blank;

FIG. 6 is a front view of a camshaft obtained by the method of the invention;

FIG. 7 is a sectional view taken along line VII—VII in FIG. 6; and

FIG. 8 is a sectional view taken along line VIII—VIII in FIG. 6.

DETAILED DESCRIPTION

Figure 1:
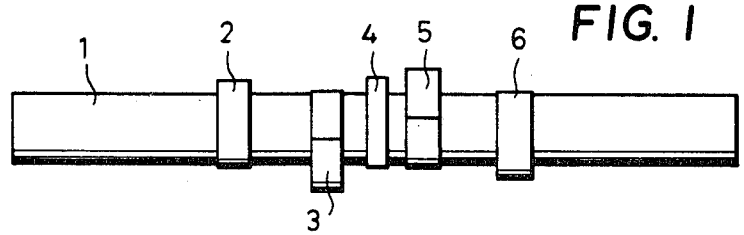
FIG. 1 is a front view of a camshaft which can be manufactured by the method of the present invention.

In manufacturing a camshaft, of which a typical one is shown at 1 in FIG. 1, by the conventional cold forging method in general, a blank for the camshaft, which is in a heated state, is positioned into a forging die having a predetermined mold configuration and compressed by applying an axial force to the blank at its opposite ends. A plurality of plane cams 2–6 are formed on the blank in a longitudinal arrangement. The camshaft thus produced by the conventional forging method may suffer the phenomenon of occurrence of breaks in the resulting forged fibre flow formed in the camshaft at locations in the vicinity of the roots of the cams 2–6. Under the worst possible conditions, there may occur cracks in the roots of the cams, resulting in very low mechanical strength of the camshaft. Therefore, the camshaft is not suitable for actual use.

The above phenomenon is due to the fact that the distribution of heating temperatures for the blank does not fit the arrangement and configurations of the cams to be formed, which impedes smooth shift or flow of the constituent metal in the blank during the compressing step.

Figure 2:
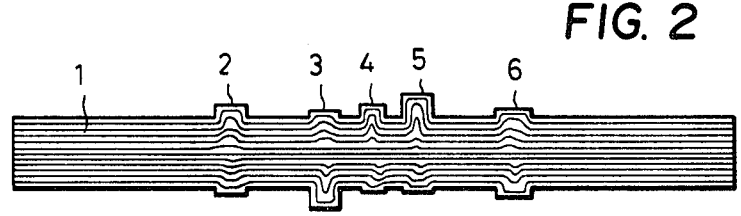
FIG. 2 is a view showing a preferred forged fibre flow for a camshaft.

A preferred forged fibre flow for the camshaft 1 is shown in FIG. 2. In order to obtain a camshaft with a breakless forged fibre flow as shown in FIG. 2, it is necessary to forge a camshaft blank so as to allow smooth shift or flow of the constituent metal in a direction and in an amount corresponding to the arrangement and configuration of each of the cams to be formed on the camshaft.

Therefore, according to the present invention, the protuberance-forming portions of a blank are heated to respective predetermined temperatures higher than the other portions, the respective predetermined heating temperatures to be applied to the individual protuberance-forming portions being proportionate, respectively, to the radial sizes of corresponding portions of the blank which are protruded from the peripheral surface of the blank for formation of the protuberances during the compressing step. The resulting article thus formed with a plurality of protuberances, such as a camshaft, has a forged fibre flow extending therein without a break and therefore has no crack formed therein.

Those metals which are soft and low in deformation resistance as well as in thermal conductivity are suitable for use as blanks for the method of the invention. In this respect, steel is particularly preferable. However, even non-ferrous metals may also be used insofar as they have sufficiently low thermal conductivity and fulfill other forging requirements.

An embodiment of the invention will now be described with reference to the drawings, wherein the invention is applied to the camshaft in FIG. 1. The camshaft shown in FIG. 1 is in a semi-finished state and will be subjected to finishing for tapering and toothing the opposite end portions for mounting in a fuel injection pump, not shown, and for engagement with associated shafts, not shown. More specifically, the illustrated camshaft 1 is intended for particular use in an in-line type fuel injection pump, not shown, for four-cylinder internal combustion engines. It is seen in FIG. 1 that a plane cam 2 is formed on the axially central portion of the camshaft 1, and plane cams 3, 4 and 5, 6 are formed at the opposite adjacent sides of the central cam 2. The cams 3, 4, 5 and 6 are adapted for engagement with the pumping plungers of an associated fuel injection pump, not shown, a tappet and other coupling elements to drive the plungers, while the central cam 2 is adapted for engagement with the pumping piston of a fuel feed pump mounted on the associated fuel injection pump to drive the piston.

Figure 5:
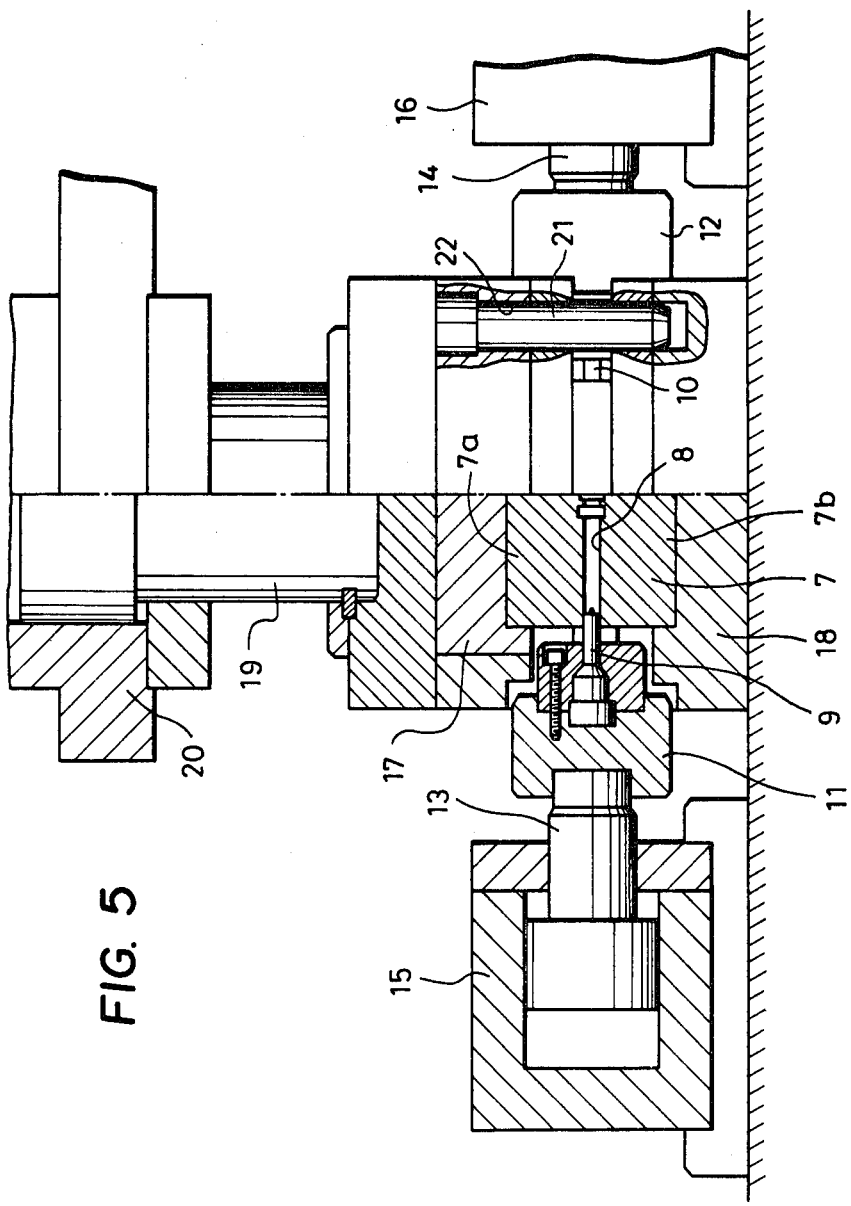
FIG. 5 is a front view of a forging machine which is adapted for use in carrying out the method of the invention, with the right half portion illustrated in section.

Such camshaft 1 can be manufactured by a forging machine as shown in FIG. 5 for instance. Reference numeral 7 designates a die consisting of an upper die 7a and a lower die 7b. A horizontally elongated cavity 8 is defined between the upper die 7a and the lower die 7b. The upper and lower dies 7a, 7b are previously heated to temperatures within a range of 90°–220° C. A blank in the form of a wire or a bar, not shown, which has been heated in a manner hereinafter described, is positioned into the cavity 8 of the hot die 7 and has its opposite ends pressed by punches 9, 10 under a maximum pressure of 170 tons (212.5 kg/cm$^2$).

The punches 9, 10 are coupled to piston rods 13, 14 via coupling members 11, 12 and are actuated by hydraulic cylinders 15, 16 through the piston rods 13, 14. The upper die 7a and the lower die 7b of the die 7 are held together by an upper die holder 17 and a lower die holder 18. The die 7 is pressed in the vertical direction under a maximum pressure of 500 tons (250 kg/cm$^2$) by a hydraulic cylinder 20 which is located above the die 7, through a piston rod 19. In FIG. 5, reference numeral 21 designates a guide rod for the piston rod, and 22 a guide bore for the guide rod 21.

The manner of forming a camshaft such as the one shown in FIG. 1 in accordance with the method of the invention will now be described. First, a steel material in the form of a wire or a bar is cut into elongated blanks, each having a suitable predetermined length. The blanks are heated in an induction furnace, particularly in a high-frequency heater or by other like means.

Figure 3:
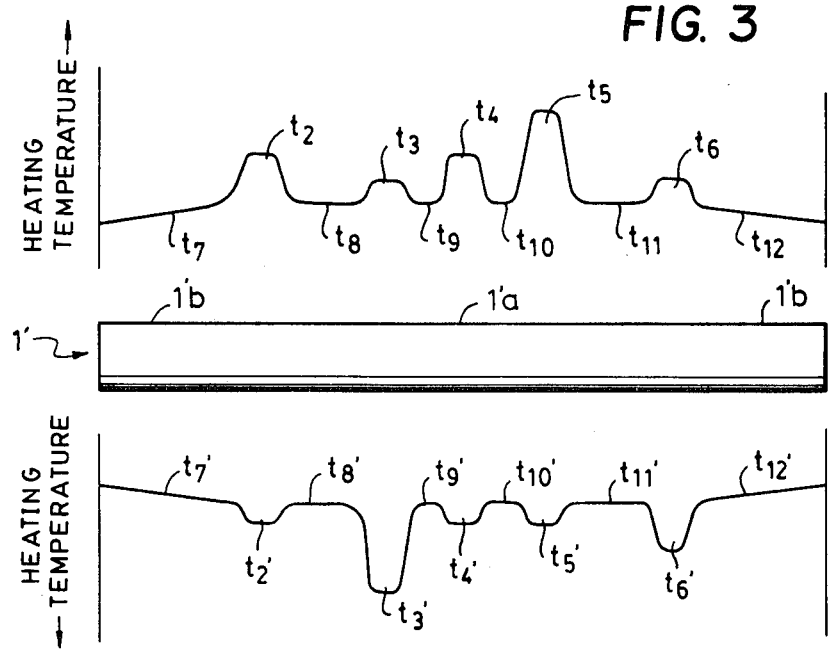
FIG. 3 is a view showing an example of the heating temperature distribution for a camshaft according to the method of the invention.

In the manufacture of camshafts according to the method of the invention, this heating step is of prime importance. FIG. 3 shows a heating temperature distribution which is applied to a blank 1' for the manufacture of a camshaft such as the one shown in FIG. 1, along its length but in a plane diametrically extending across the blank. As is noted from FIG. 3, the heating temperatures t2–t6, t2'–t6' for the portions of the blank 1' where the cams 2–6 in FIG. 1 are to be formed are higher than the other portions.

Further, in the individual cams, the heating temperatures t2, t3', t4, t5, t6' for the relatively largely projected portions of the cams are higher than those t2', t3, t4', t5', t6 for the relatively small projected portions. That is, the heating temperatures are set at values proportionate, respectively, to the radial sizes of corresponding portions of the blank 1' which are protruded from its peripheral surface for formation of the cams during compression of the blank 1' within the forging die. For example, in FIG. 3 the highest heating temperatures t3, t5 are approximately 1,200° C., the second highest ones t2, t4, t6' approx. 1,000° C., ones t2', t3, t4', t6 lower than the above two ones approx. 900° C., ones t8–t11' for the throughs between the cams approx. 800° C., and ones t7, t7', t12, t12' for the opposite end portions approx. 700° C., respectively.

However, the heating temperatures for the cam-forming portions, which are applied to the blank 1' in other planes diametrically extending across it, are naturally different from those mentioned above. That is, different heating temperatures are applied to circumferentially different surfaces of the cam-forming portions of the blank 1', depending upon the profiles of the cams to be formed.

Further as shown in FIG. 3, the axial heating temperature distribution has a characteristic that the heating temperature which is applied to the blank 1' along its axial length generally decreases from the axially central portion 1'a of the blank 1' towards the opposite ends 1'b, 1'b.

The blank is heated usually for 10 seconds to 1 minute up to predetermined heating temperatures starting from the room temperature.

By heating the blank 1' in the above-mentioned manner, the blank can have different deformation resistances at its various portions in such a manner that the heated blank has different values of softness which are in accordance with the sequence and direction of projection of cams. As a consequence, during the composition of the blank, there occurs smooth flow of the constituent metal in accordance with the configurations and arrangements of the cams to be formed, thus preventing the occurrence of discontinuities in the resulting forged fibre flow and cracks in the resulting camshaft.

FIG. 4 illustrates a heating coil 23 used in a heating apparatus adapted for use in the manufacture of the camshaft in FIG. 1, in which the heating coil 23 is illustrated in section. The heating apparatus is of the induction heating type. Since according to the induction heating, heating temperatures are employed which are inversely proportionate to the distances between the heating coil 23 and the blank 1', various portions of the heating coil 23 are arranged in an inverse relation to the heating temperature curves in FIG. 3.

The steel blank 1' in the form of a wire or a bar is heated by means of the heating coil 23 arranged as above, and then the blank thus in a hot state is positioned into the die 7 of the forging machine shown in FIG. 5. The upper hydraulic cylinder 20 is then actuated to hold the die 7 closed by piston 19 and die holders 17, 18, while simultaneously the hydraulic cylinders 13, 14 located at the opposite ends of the die 7 are also actuated to cause the punches 9, 10 to apply 100–170 tons of pressure to the opposite ends of the hot blank in the die in the axial directions. By this pressure application, the cams 2–6 are formed as shown in FIG. 1, with their peripheries definitely shaped.

Then, the blank thus formed with the cams are quenched at its surfaces under conventional conditions and ground into an accurate finishing size.

In the above-given embodiment, Steel Bar S48C and S45C according to Japanese Industrial Standard (JIS) G 3102 can be used as preferable materials for the camshaft. These bars have the following compositions:

| | Chemical Composition | |
|---|---|---|
| | S48C | S45C |
| C: | 0.45–0.51% | 0.42–0.48% |
| Si: | 0.15–0.35% | 0.15–0.35% |
| Mn: | 0.60–0.90% | 0.60–0.90% |
| P: | 0.030% or less | 0.030% or less |
| S: | 0.035% or less | 0.035% or less |
| Fe and Inevitable Impurities: | the balance | the balance |

The inevitable impurities consist of 0.30% or less Cu, 0.20% or less Ni and 0.20% or less Cr, the total of Ni and Cr not exceeding 0.35%.

As a material for the blank may also be used Steel Bar SCM 21H (chromium-molybdenum steel) according to JIS G 4051 which has a chemical composition of 0.12–0.18% C, 0.15–0.35% Si, 0.55–0.90% Mn, 0.030% or less P, 0.030% or less S, 0.85–1.25% Cr, 0.15–0.35% Mo and the balance of Fe and inevitable impurities, the inevitable impurities including 0.25% or less Ni.

Since the above-cited steels are rather soft, has low deformation resistance and may suffer less deoxidation and less decarbonization, they are particularly suitable for use as blanks for forging by the method of the invention.

In the aforedescribed embodiment, the dimensions of the blank before and after forging are shown below:

| | Before Forging | After Forging |
|---|---|---|
| Length: | 300mm | 236mm |
| Diameter: | 22.5mm | 23mm |

The camshaft obtained by the forging method of the aforedescribed embodiment has a configuration and a size as shown in FIGS. 6, 7 and 8. The parenthesized figures represent sizes after finish grinding.

A camshaft thus obtained by the forging method according to the invention can have a forged fibre flow extending therein with no substantial break as shown in FIG. 2, and therefore has sufficient mechanical strength.

Incidentally, the heating temperatures for the camshaft blank according to the invention are not limited to the values stated in the foregoing. In accordance with this invention, so far as the heating temperatures are within a range of temperatures at which forging operations are possible, the lower the heating temperatures, the more effective the forging method is, since the blank suffers less decarbonization and less oxidation if it is heated to such lower temperatures. Further, since the camshaft produced by the method of the invention has been subjected to heating before pressing in the die, after pressing it need not be subjected to annealing or normalization for removal of residual stress.

It is to be understood that the foregoing description relates to a preferred embodiment of the invention and that various changes and modifications may be made in the invention without departing from the spirit and scope thereof.

What is claimed is:

1. A method of manufacturing by forging an elongated article having a plurality of protuberances, said protuberances being enlarged radially outwardly, and integrally formed on an outer peripheral surface of said article in a longitudinal arrangement, the method comprising:
   (a) heating an elongated blank of a metal or an alloy thereof such that the blank has a plurality of protuberance-forming portions thereof heated to respective predetermined termperatures higher than the other portions thereof;
   (b) then positioning a substantially whole portion of said blank thus heated into a forging die; and
   (c) axially applying pressure to said heated blank at opposite ends thereof with said blank in a heated state in said forging die to cause same to be axially compressed such that said protuberance-forming portions are radially outwardly deformed only by said axial pressure application and protuberances are formed on the protuberance-forming portions of the outer peripheral surface of said blank;
   (d) said heating step comprising heating said blank such that said respective predetermined heating temperatures for said protuberance-forming portions of said blank are proportionate, respectively, to the radial sizes of corresponding ones of said protuberance-forming portions of said blank which are protruded from the peripheral surface of said blank for formation of said protuberances in said step (c).

2. The method as claimed in claim 1, wherein said blank is a blank for a camshaft.

3. The method as claimed in claim 1, wherein said heating step (a) includes heating said blank along an axial length thereof in a manner generally decreasing in heating temperature from an axially central portion of said blank towards opposite ends thereof.

4. The method as claimed in claim 2, wherein said camshaft blank is made of steel; and said heating step (a) comprising heating a plurality of portions of said camshaft blank where cams are to be formed, to temperatures within a range of from 900° C. to 1,200° C., and the other portions of said camshaft blank to temperatures within a range of from 700° C. to 800° C.

5. The method as claimed in any one of claims 1, 2, 3 or 4, wherein said heating step comprises heating said blank along an axial length thereof by an induction heating coil which axially extends along said blank and surrounds said blank, said coil being disposed so that said coil has a plurality of portions thereof spaced from said protuberance-forming portions of said blank by distances inversely proportionate, respectively, to the radial sizes of corresponding ones of said protuberance-forming portions of said blank which are protruded from the peripheral surface of said blank for formation of said protuberances.

* * * * *